Figure 5:
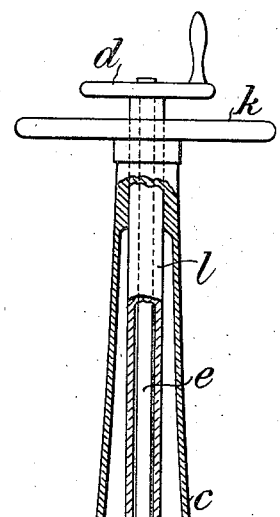

No. 827,993. PATENTED AUG. 7, 1906.
J. R. PEIRCE.
STONE WORKING MACHINE.
APPLICATION FILED JAN. 15, 1906.
4 SHEETS—SHEET 1.
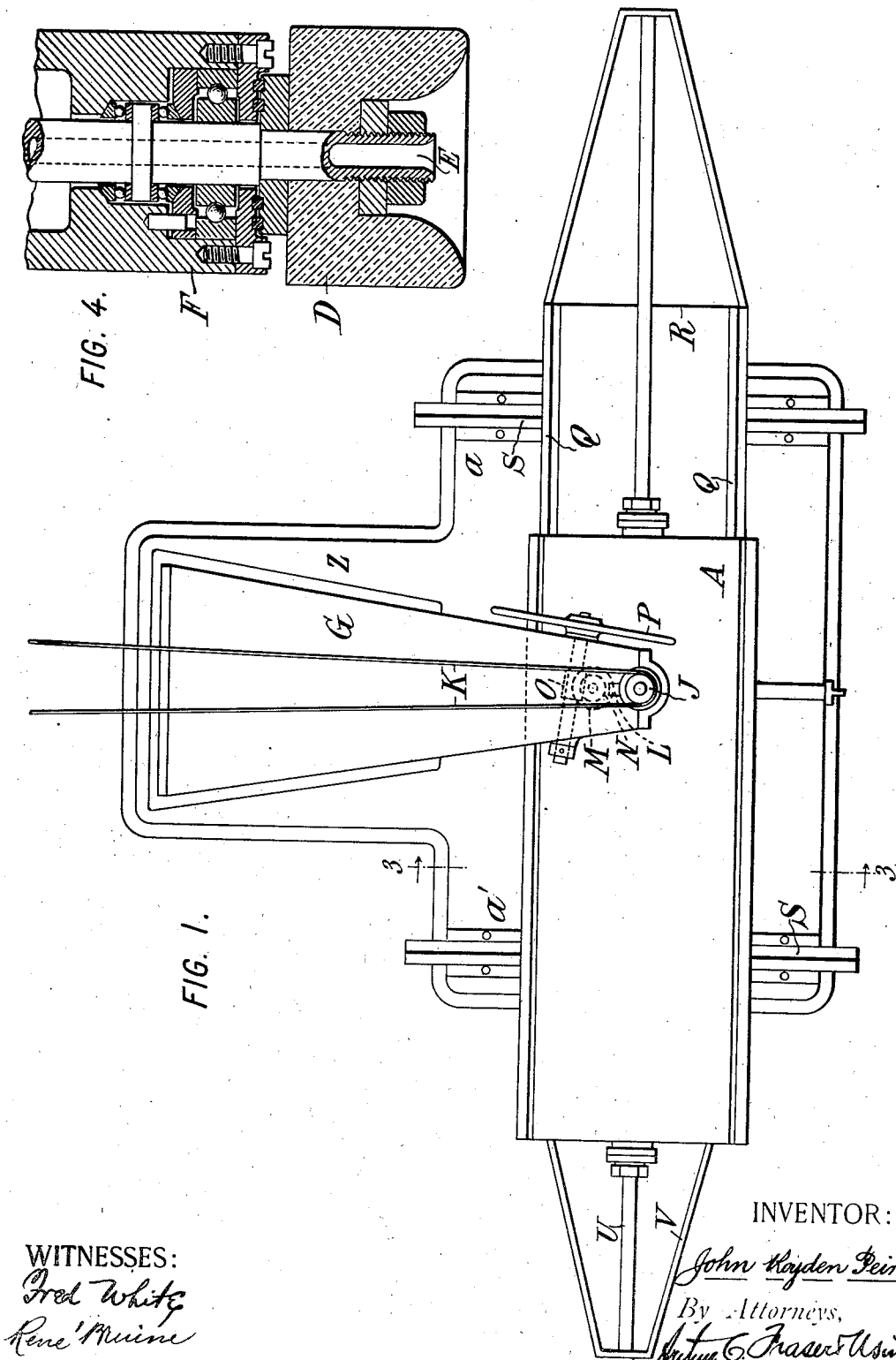
WITNESSES:
Fred White
Rene Muine
INVENTOR:
John Hayden Peirce,
By Attorneys,
Arthur C. Fraser & Usina No. 827,993. PATENTED AUG. 7, 1906.
J. R. PEIRCE.
STONE WORKING MACHINE.
APPLICATION FILED JAN. 15, 1906.
4 SHEETS—SHEET 2.
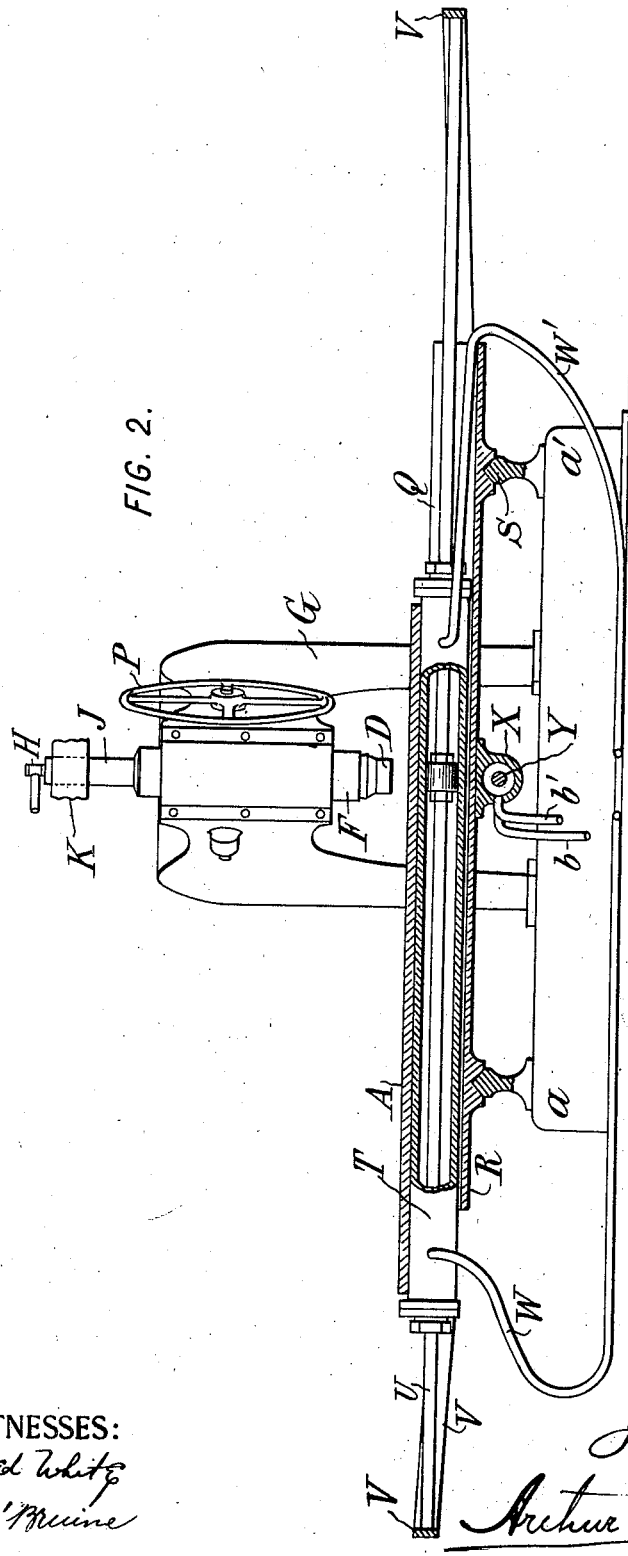
WITNESSES:
INVENTOR:
John Hoyden Peirce,
By Attorneys, No. 827,993. PATENTED AUG. 7, 1906.
J. R. PEIRCE.
STONE WORKING MACHINE.
APPLICATION FILED JAN. 15, 1906.
4 SHEETS—SHEET 3.
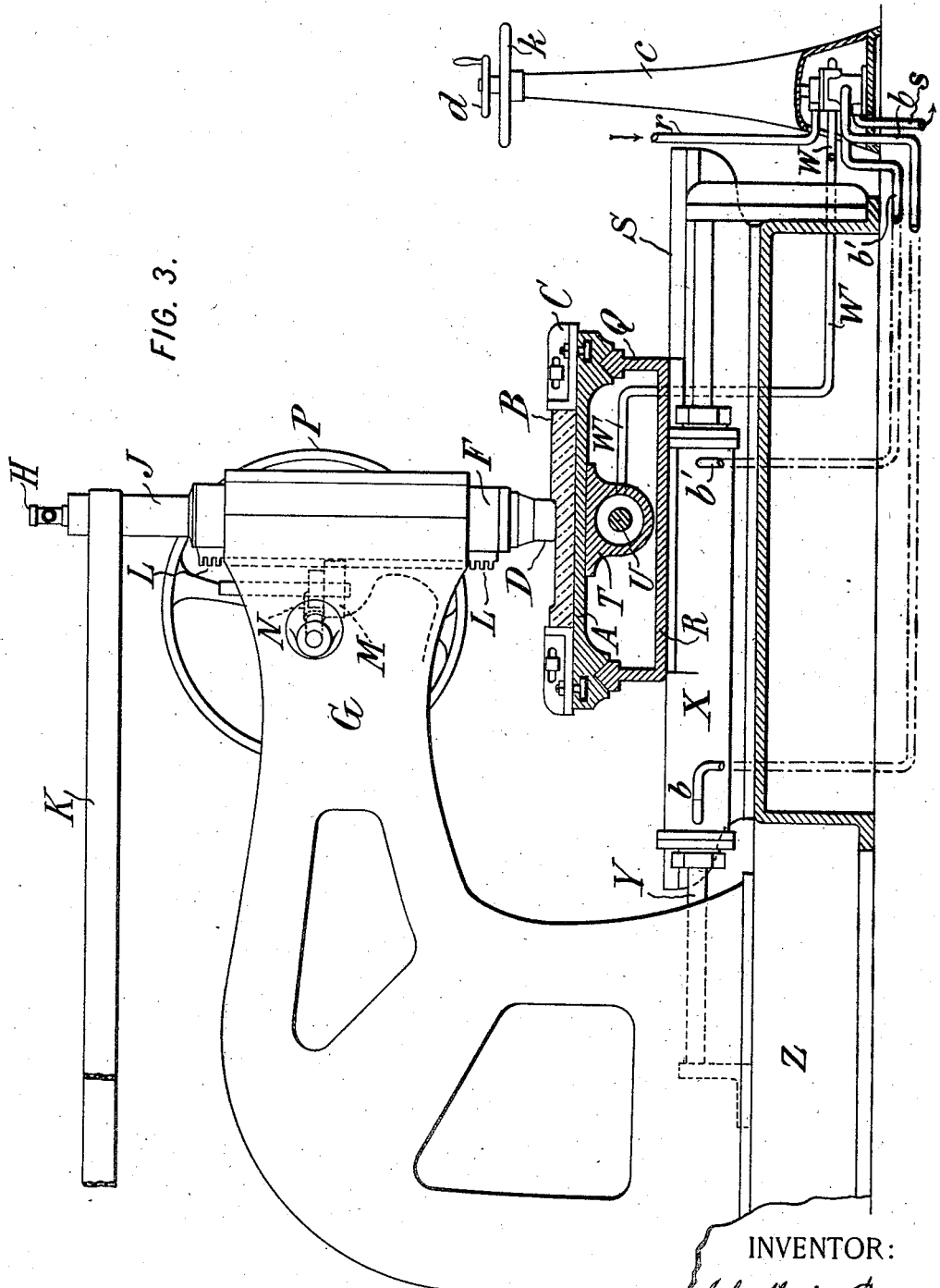
WITNESSES:
INVENTOR:
John Hayden Peirce,
By Attorneys, No. 827,993. PATENTED AUG. 7, 1906.
J. R. PEIRCE.
STONE WORKING MACHINE.
APPLICATION FILED JAN. 15, 1906.

4 SHEETS—SHEET 4.

WITNESSES:
Fred White
René Buine

INVENTOR:
John Royden Peirce,
By Attorneys,
Arthur E. Fraser & Uena

UNITED STATES PATENT OFFICE.

JOHN ROYDEN PEIRCE, OF NEW YORK, N. Y.

STONE-WORKING MACHINE.

No. 827,993.      Specification of Letters Patent.      Patented Aug. 7, 1906.

Application filed January 15, 1906. Serial No. 296,144.

*To all whom it may concern:*

Be it known that I, JOHN ROYDEN PEIRCE, a citizen of the United States, residing in the borough of Manhattan, city, county, and State of New York, have invented certain new and useful Improvements in Stone-Working Machines, of which the following is a specification.

This invention aims to provide an improved apparatus for working stone, and especially marble. The invention, for example, may be applied in a countersinking-machine or a molder and for cutting in a straight, circular, or irregular line, putting a molding on an irregularly-shaped slab, and for other similar work.

The improvement is chiefly in the mechanism for feeding the stone to the countersinking, molding, or other tool, which mechanism is arranged to feed the stone in two directions simultaneously, the rate of feed in each of said directions being capable of regulation, so as to secure a resultant movement in any desired direction. The regulating means is under the constant control of the operator, so that the direction of feed may be perfectly controlled to obtain a cut along any line previously marked out on the stone or otherwise. Preferably a pair of separate fluid-pressure mechanisms are utilized, the valves of said mechanisms being simultaneously operable.

An important feature is the arrangement of the mechanism in such a way that by moving the controlling means continuously in one direction the feed will be in a substantially circular direction and by holding the controlling means stationary at any point the feed will continue in a tangent to the circular arc. The feeding mechanism is especially useful when combined with a tool of the type described in my previous application filed June 19, 1905, Serial No. 266,062, and others, said tool comprising a rapidly-rotating wheel, of carborundum or the like, which in the case of a countersinking-machine is provided with a vertical passage for water through its center.

The accompanying drawings illustrate a countersinking-machine embodying the invention.

Figure 7:
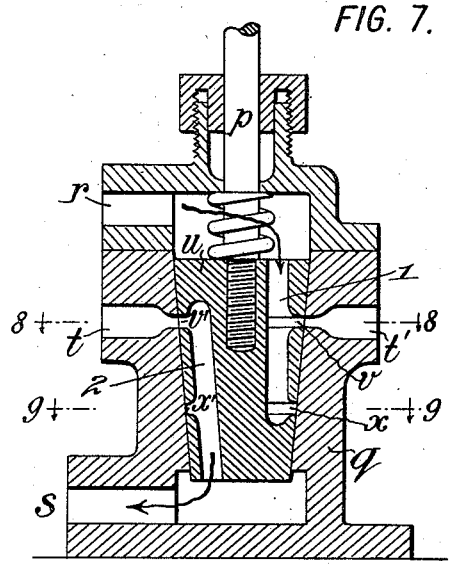
Figure 8:
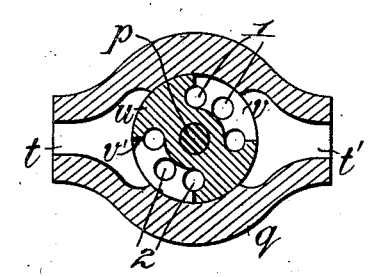
Figure 6:
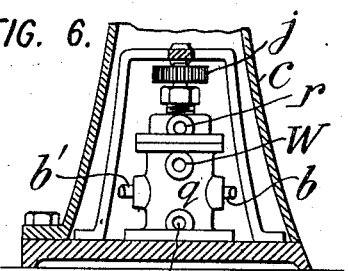
Figure 9:
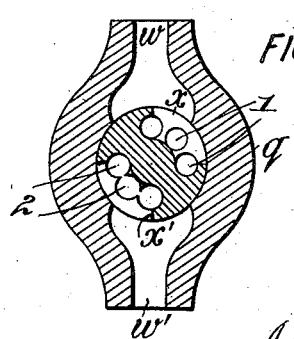

Figure 1 is a plan. Fig. 2 is in part a front elevation and in part a longitudinal section. Fig. 3 is in part a side elevation and in part a transverse section on the line 3 3, Fig. 1. Fig. 4 is a detail in vertical section of the lower end of the tool-shaft. Fig. 5 is a longitudinal section of the controlling device, the valve-casing being shown in elevation. Fig. 6 is an elevation of the valve-casing and adjacent parts at right angles to Fig. 5. Fig. 7 is a vertical section of the valve and casing. Figs. 8 and 9 are horizontal sections of the valve on the planes 8 8 and 9 9, respectively, indicated in Fig. 7.

Referring to the embodiment illustrated, A is a bed or table of any usual or suitable type, upon which the stone B is clamped by means of clamps C.

D is a countersinking-tool, of carborundum, which is rotated at a high rate of speed (two thousand to five thousand revolutions per minute) and is held rigidly against lateral movement, while the bed A and the stone are moved in any desired direction.

The cutting wheel or cylinder D is hollow at the center, as indicated in Fig. 4, and is clamped on the lower end of a hollow shaft E, carried in antifriction-bearings in a shaft-holder F, which is adjustable vertically in a rigid arm G. The shaft E is provided with a nipple H at its upper end for connection with a hose and with a broad pulley or drum J for driving it from a belt K in any position of vertical adjustment. This arrangement obviates directly all gearing or complication in the driving of the cutting-tool. For countersinking, a very minute adjustment is desirable, and this is obtained by providing a rack L on the shaft-holder F, which rack is driven by a worm-wheel M, the latter being fixed on the same shaft with another worm-wheel N, driven by a worm O, which is rotated by a hand-wheel P at the side of the arm G and projecting forwardly sufficiently to be within reach of the operator at the front of the machine. In the machine shown the vertical adjustment of the tool is one-sixteenth of an inch for each revolution of the hand-wheel P.

In order to obtain the desired movements of the stone, the bed A is arranged as a slide, moving on suitable guides Q upon a lower slide R, the latter moving upon guides S, fixed upon the bed of the machine, the guides Q and S being at a right angle to each other. The power-operated mechanism for sliding the bed A is likewise carried upon the lower slide R, so that when the latter is moved along its guides S it carries with it the bed A and the mechanism for moving the bed A along its guides Q. If both slides be operated at the same time, we obtain a movement of the bed and the stone which is a resultant of the two elementary movements and the direction of which depends upon the speed of each of the two elementary movements.

The mechanism for moving the upper slide or bed A consists of a cylinder T, fixed upon the under side of the bed, and through which passes a piston-rod U, carrying at its central point a piston and having its ends supported against stirrups V, fastened upon the ends of the lower slide R. From the opposite ends of the cylinder T run flexible pipes W W' to the valve hereinafter described. The use of a hydraulic cylinder for operating the upper bed is particularly advantageous in that there are no complications involved in moving it laterally as well as longitudinally. A similar mechanism is preferably used for the lower slide R, which facilitates the simultaneous regulation of the movements of the two slides. Hydraulic power has also the advantage that it feeds the stone with a very rigid movement and can be perfectly controlled to produce a very accurate movement. The cylinder X for the lower slide R is also carried on the under side of the slide. The arm G is bifurcated at its base, and the piston-rod Y of the lower slide is run back through the base portion of the arm, so as to obtain a sufficiently extended movement of the cylinder without having to extend the piston-rod Y beyond the front of the machine, where it would interfere with the operator. The cylinder X is so arranged relatively to the slide R that the cylinder is at the central point of the piston-rod when the slide is arranged with its center immediately under the tool. The base of the machine is substantially T-shaped, with a rearward extension Z for supporting the tool-carrying arm G and with side extensions $a$ $a'$ for supporting the guides S, upon which the lower slide travels. The lower cylinder X is connected by flexible pipes $b$ $b'$ to the valve.

The controlling mechanism is mounted in a stand or casing $c$ at the front of the machine. Preferably a pair of controlling devices are used—one for securing slow changes of direction and the other for securing quick changes. The hand-wheel $d$ upon the shaft $e$ operates a pinion $f$, which through pinions $g$ and $h$ drives the pinion $j$ on the valve-stem at a reduced speed. The hand-wheel $k$ on the outer hollow shaft $l$ operates through pinions $m$, $n$, and $o$ to drive the pinion $j$ and the valve-spindle $p$ at a greater speed.

The valves for the two slides are in construction one double valve upon the same spindle $p$ and within the same casing $q$. The water or other suitable liquid enters at $r$ under pressure and is discharged at $s$. The upper part of the casing is provided with diametrically opposite ports $t$ $t'$, connected, respectively, to the flexible pipes W W' of the upper slide. The valve-plug $u$ is provided with ports on the same level as the ports $t$ $t'$, these being, respectively, a port $v$, connected with the upper end of the valve-chamber by the triple passages 1, and therefore constituting an inlet-port, and a diametrically opposite port $v'$, connected with the lower end of the valve-chamber by the triple passages 2, and therefore constituting an outlet-port. On a plane below the ports $t$ $t'$ and in a line at right angles to the latter are arranged ports $w$ $w'$ for connection, respectively, with the flexible pipes $b$ $b'$, running to opposite ends of the cylinder of the lower slide R. On the same plane with the ports $w$ $w'$ the valve-plug $u$ is provided with an inlet-port $x$, communicating with the inlet-passage 1, and an outlet-port $x'$, communicating with the outlet-passage 2. The ports $x x'$ of the valve-plug are arranged in line with the ports $v$ $v'$ above. The ports $t$ $t'$ $w$ $w'$ in the casing should be throughout their length of sufficient size in cross-section to permit a free flow of water at the pressure used. The ports and passages of the valve-plug should have a cross-section at least equal to that of the casing-ports, so as to oppose no resistance to the flow when the valve is wide open. The ports $v$, $v'$, $x$, and $x'$ in the valve-body each have a width of a quadrant of a circle, and the casing-ports $t$, $w$, $t'$, and $w'$ form, along their lines of contact with the valve-body, successive quadrants. Thus as the forward edges of the valve-ports $v'$ and $v$ pass beyond the casing-ports $t$ and $t'$ the forward edges of the valve-ports $x'$ and $x$ enter the area of the casing-ports $w$ and $w'$, respectively. So, also, as each valve-port passes entirely beyond one casing-port it begins to enter the casing-port immediately opposite.

Suppose one set of ports $t$ $t'$ being connected to the cylinder of a slide arranged to have an individual west-and-east motion in accordance as the pressure is supplied through the port $t$ or $t'$ and the ports $w$ $w'$ connected to the cylinder of the other slide arranged to have an individual north-and-south movement as the power is supplied through the port $w$ or $w'$, respectively. With the valve in the position of Figs. 8 and 9 the two inlet-ports $v$ and $x$ will be equally open, so as to produce a rectilinear movement, which is the resultant of an eastern and a northern movement of equal velocity, this resultant being a movement in a northeast direction. Suppose the valve-stem to be moved now one-eighth of a revolution to the right. The port $v$ will be wide open and the port $x$ closed, and the work will have a rectilinear movement in a straight easterly direction. Another eighth of a turn will leave the port $v$ half open in the easterly direction and the port $x$ half open in the southerly direction, producing a rectilinear southeastward movement, and so on, by continuing the movement of the hand-wheel $d$ or $k$ the stone will move in a gradually-changing direction, so as to describe a complete circle or a substantially circular arc of any desired length. This operation may be continued to describe either a complete circle or an arc of any desired length. If after describing a circular arc of, say, a quadrant's length, as is common at the corners of countersunk slabs, it is desired to continue in a rectilinear direction tangent to the arc described, it is only necessary to hold the controlling means stationary.

Though I have described with great particularity of detail a certain embodiment of the invention, yet it is not to be understood therefrom that the invention is limited to the specific embodiment disclosed. Various modifications thereof in detail and in the arrangement and combination of the parts may be made by those skilled in the art without departure from the invention.

What I claim is—

1. A stone-working machine including a pair of rectilinearly-moving feeding mechanisms for feeding the stone in two directions at an angle with each other simultaneously, and controlling means for regulating the relative rates of feed in said directions to secure a resultant rectilinear movement in any desired direction.

2. A stone-working machine including a pair of separate rectilinearly-moving fluid-pressure mechanisms for feeding the stone in two directions at an angle with each other, and means for regulating the relative rates of feed in said directions to secure a resultant rectilinear movement in any desired direction.

3. A stone-working machine including a pair of separate fluid-pressure mechanisms for feeding the stone in two directions at an angle with each other, and controlling means for regulating simultaneously the operation of said mechanisms to secure a resultant movement in any desired direction.

4. A stone-working machine including a lower slide movable in one direction, an upper slide carried thereby and movable in a direction at an angle with the direction of the lower slide, rectilinearly-moving means for operating said slides simultaneously, and means for regulating the relative rates of feed in said directions to secure a resultant rectilinear movement of the upper slide in any desired direction.

5. A stone-working machine including a lower slide movable in one direction, an upper slide carried thereby and movable in a direction at an angle with the direction of the lower slide, and separate rectilinearly-moving fluid-pressure mechanisms for operating said slides, and means for regulating the relative rates of feed in said directions to secure a resultant rectilinear movement in any desired direction.

6. A stone-working machine including in combination a cutting-tool, a lower slide R, and guides S therefor, guides Q carried upon said lower slide, and an upper slide A movable on said guides Q and constituting a bed for carrying the stone, a cylinder T carried by said upper slide, a piston-rod U running through said cylinder, extensions V at the ends of said lower slide R engaging the ends of said piston-rod, a cylinder X carried by said lower slide R, and a piston-rod Y extending through said cylinder X, and an arm G supporting the cutting-tool and open at its base, the rear end of said piston-rod Y being extended back into the base portion of said arm G whereby to secure an extended movement without projecting the piston-rod Y beyond the front of the machine.

7. A stone-working machine including a pair of rectilinearly-moving feeding mechanisms for feeding the stone in two directions at an angle with each other simultaneously, controlling means for regulating the relative rates of feed in said directions to secure a resultant rectilinear movement in any desired direction, and a rapidly-rotating countersinking tool in a fixed position for operating on the face of said stone.

8. A countersinking-machine including in combination a countersinking-tool D of carborundum, means for rotating the same rapidly about a vertical axis, a pair of rectilinearly-moving mechanisms for feeding the work thereto simultaneously in two directions at an angle with each other, and controlling means for regulating the relative rates of feed in said directions so as to secure a resultant rectilinear movement in any desired direction.

9. A stone-working machine including power-operated mechanisms for feeding the stone in two directions at an angle with each other simultaneously, and controlling means therefor arranged to determine a resultant movement in any desired direction and to secure a substantially circular feed as the controlling means is moved continuously in one direction.

10. A stone-working machine including power-operated feeding mechanism, and controlling means therefor arranged to secure a substantially circular feed as the controlling means is moved continuously in one direction, and to secure a tangential feed when the controlling means is held stationary.

11. A stone-working machine including a pair of separate fluid-pressure mechanisms for feeding the stone in two directions at an angle with each other, and a double valve for regulating the operation of said respective mechanisms, the parts of said valve pertaining to both mechanisms being simultaneously operable.

12. A stone-working machine including a pair of separate fluid-pressure mechanisms for feeding the stone in two directions at an angle with each other, and a double valve for regulating the operation of said respective mechanisms, the parts of said valve pertaining to both mechanisms being simultaneously operable, and arranged to secure a substantially circular movement as they are moved continuously in one direction.

13. A stone-working machine including power-operated mechanisms for feeding the stone in two directions at an angle with each other simultaneously, controlling means therefor arranged to determine a resultant movement in any desired direction and to secure a substantially circular feed as the controlling means is moved continuously in one direction, and gearing for operating said controlling means at a faster or slower rate at will.

14. A stone-working machine including a pair of separate fluid-pressure mechanisms for feeding the stone in two directions at an angle with each other, a double valve for regulating the operation of said respective mechanisms, the parts of said valve pertaining to both mechanisms being simultaneously operable, and gearing for operating said valve at a quicker or slower rate at will.

In witness whereof I have hereunto signed my name in the presence of two subscribing witnesses.

JOHN ROYDEN PEIRCE.

Witnesses:
 EUGENE V. MYERS,
 FRED WHITE.